(12) United States Patent
Estoque

(10) Patent No.: US 11,731,176 B2
(45) Date of Patent: Aug. 22, 2023

(54) REFURBISHING SYSTEM FOR REUSABLE CHILD-SAFE CONTAINERS

(71) Applicant: Daniel Anthony Estoque, Boulder, CO (US)

(72) Inventor: Daniel Anthony Estoque, Boulder, CO (US)

(73) Assignee: MEDILOQ LLC, Boulder, CO (US)

( * ) Notice: Subject to any disclaimer, the term of this patent is extended or adjusted under 35 U.S.C. 154(b) by 514 days.

(21) Appl. No.: 16/831,412

(22) Filed: Mar. 26, 2020

(65) Prior Publication Data

US 2020/0307845 A1  Oct. 1, 2020

Related U.S. Application Data

(60) Provisional application No. 62/827,212, filed on Apr. 1, 2019.

(51) Int. Cl.
| | |
|---|---|
| *B08B 9/08* | (2006.01) |
| *B65B 55/24* | (2006.01) |
| *B67C 7/00* | (2006.01) |
| *B65B 43/46* | (2006.01) |
| *B08B 9/093* | (2006.01) |
| *B08B 9/087* | (2006.01) |
| *B25J 11/00* | (2006.01) |
| *B65B 43/00* | (2006.01) |

(52) U.S. Cl.
CPC ............ *B08B 9/0826* (2013.01); *B08B 9/087* (2013.01); *B08B 9/093* (2013.01); *B25J 11/0085* (2013.01); *B65B 43/46* (2013.01); *B65B 55/24* (2013.01); *B67C 7/00* (2013.01); *B08B 2209/08* (2013.01); *B65B 43/00* (2013.01)

(58) Field of Classification Search
CPC ..... B08B 9/0821; B08B 9/0826; B08B 9/093; B08B 9/20; B08B 9/205; B08B 9/28; B08B 2209/08; B25J 11/0085; B67C 7/00; B65B 43/00
See application file for complete search history.

(56) References Cited

U.S. PATENT DOCUMENTS

| | | | |
|---|---|---|---|
| 7,325,667 B1 * | 2/2008 | Damick | ................. B65G 59/02 198/395 |
| 2015/0166208 A1 * | 6/2015 | Miyauchi | ............... B25J 9/1612 53/381.1 |
| 2022/0080605 A1 * | 3/2022 | Iwasaki | .................... B25J 11/00 |

FOREIGN PATENT DOCUMENTS

WO   WO-2010140043 A2 *  12/2010  ............. B08B 3/022

* cited by examiner

*Primary Examiner* — David G Cormier
(74) *Attorney, Agent, or Firm* — Snell & Wilmer L.L.P.

(57) ABSTRACT

An automated refurbishment system for cleaning and testing recycled child-safe containers. The system takes in durable, child-safe container bodies and caps after usage, washes the container parts reduce an amount of contaminants, and then dries the washed parts. The system then assembles the child-safe container bodies to caps, and tests the assembled child-safe containers, to assess the functionality of the child-safe features. The clean and tested refurbished child-safe containers can then be reused to dispense controlled substances (e.g., pharmaceuticals). Specific modules of the system can be interchanged to allow compatibility with different styles and designs of child-safe containers. The refurbishment system facilitates the recycling and reuse of durable, child-safe containers as an alternative to the current practice of using single-use, disposable plastic child-safe containers to dispense prescription pills and other controlled substances.

16 Claims, 8 Drawing Sheets

REFURBISHING SYSTEM FOR REUSABLE CHILD-SAFE CONTAINERS

CROSS-REFERENCE TO RELATED APPLICATIONS

This patent application is a non-provisional patent application of, and claims the benefit of, U.S. Provisional Patent Application No. 62/827,212, that is entitled, "REFURBISHING SYSTEM FOR REUSABLE CHILD-SAFE CONTAINERS," that was filed on Apr. 1, 2019, and the entire disclosure of which is hereby incorporated by reference in its entirety herein.

FIELD

The present invention relates generally to an automated system for the cleaning and testing of child-safe containers. More specifically, the present invention is embodied by a system for processing child-safe containers designed for multiple uses, the containers having a long-lasting, durable construction, which can withstand cycles of repeated use, cleaning or sterilizing, and testing without compromising the integrity of the child-safe feature(s).

BACKGROUND

Currently, prescription pills and other controlled substances are required by law to be dispensed by pharmacies and dispensaries in exit containers certified to be child-safe. Currently these child-safe containers are typically low-cost, plastic products designed for a single use, and intended to be disposed as waste when empty. When the container is empty the consumer disposes the exit container and obtains their refilled prescription in a new, unused child-safe container.

Single-use, disposable plastics, such as plastic bags and drinking straws, are now viewed as environmentally wasteful, with numerous countries and jurisdictions banning use, or planning to phase out their use. One type of single-use plastic item not yet addressed in these efforts are disposable, prescription pill bottles. One difficulty in targeting these items for reuse and recycling is that current prescription pill bottles are designed for a single use and therefore low cost. As such, they are not suitable for high reliability and typical refurbishing processes such as high temperature washing, sterilization or high reliability of the child-safe features.

SUMMARY

A child-safe container refurbishment system is presented herein. Both the configuration of such a child-safe refurbishment system and the operational characteristics of such a child-safe container refurbishment system are within the scope of this Summary. As used herein, the term "container" is the combination of a cap and a container body.

The overall refurbishment system may include several subsystems, each performing a specific function. The subsystems may include a wash/dry station, a multi-axis robotic arm with gripper, a container capping station, output trays, and a reject bin.

The wash station may utilize racks for holding incoming caps and container bodies separately, water jets for spraying pressurized cleaning solution and rinse agent in order to clean and rinse the container bodies and caps (e.g., in an un-assembled state or configuration), and drying components which may include fans and heaters. Mechanisms for manipulating or repositioning of the caps and container bodies are also included for optimum cleaning or draining.

Some embodiments of the wash station may include mechanical scrubbers or brushes to facilitate removal of previous contents, debris or labels. Water or cleaning and rinsing solutions may be introduced by external plumbing, which are then drained to waste, or the fluidics can be a closed system.

The multi-axis robotic arm may include an arrangement of linear, rotating or articulating stages that allow the positioning of a main gripper throughout the system. The main gripper securely grasps or squeezes caps and container bodies so that they can be moved and positioned for the various operations.

The container capping station may include a lower gripper and an upper gripper. The lower gripper may be held stationary, while the upper gripper may be attached to a mechanism that can both rotate and move along an axis (e.g., vertically). The upper gripper may include sensors that can detect vertical travel position and vertical force applied to/by the upper gripper.

The output trays may serve to hold and store washed, fully assembled, finished, refurbished child-safe containers. In some embodiments the container bodies and caps can be placed in the output trays separately.

In other embodiments, the system can be coupled to other systems that dispense medication into the container bodies (prior to positioning the cap thereon) and properly print and label each container with the content and patient information.

In typical use, an operator may load used, incoming caps and container bodies into the wash station separately. The caps may be positioned downward on racks to promote draining. The container bodies may be positioned on a spring-loaded rotary rack which allows their orientations to be changed to either: downwards to facilitate draining of fluids during the wash and drain operation, or upwards to be picked up the robotic arm.

After loading the caps and container bodies facing downwards into the wash station by an operator, the station may be closed and a wash-dry operation may be performed, similar to a household dish washing machine. External labels can be constructed to be easily removed from the container bodies during the wash cycle. Examples for the removable labels are ones which dissolve by water, special solutions, mechanical scrubbing or by heat.

Once the wash and dry cycles are complete and the container bodies and caps are clean and dry, the rotary container body racks position the container bodies facing upwards, and the wash station door is opened to allow access to the caps and container bodies by the robotic arm.

The robotic arm with main gripper end effecter may be used to move an individual container body from the rotary rack of the wash station and place it facing upwards in the lower gripper of the capping station (which may have been moved out of alignment with the upper gripper of the capping station for this loading operation). The lower gripper of the capping station may hold the container body securely by mechanical means such as pneumatic pressure, mechanical clamping, or the like.

The main gripper of the multi-axis robot may release the container body, and may then return to the wash station to retrieve one of the clean and dry caps which may be facing downwards. The robotic arm and main gripper may move one of the clean caps to the capping station and places it loosely on top of the container body, which again is being held securely in the lower gripper of the capping station.

After releasing the cap, the robotic arm moves out of the way, the lower gripper may be moved back into alignment with the upper gripper, and the upper gripper of the capping station may move downwards and grip the cap. Once the upper gripper of the capping station grips the cap, the linear and rotary stages of the upper gripper may push down and rotate the cap on to the container body to engage the child-safe locking feature(s).

After securing (e.g., locking) the cap and container body together (e.g., using one or more child-safe features), the upper gripper may test the child-safe functionality of the assembled cap and container body by performing programmed pushing, pulling and rotating actions on the cap, while monitoring applied force, rotary and vertical travel to ensure that the cap and container body have maintained their child-safe functionality.

If the system determines that the cap and container body (e.g., in an assembled container configuration) passes the child-safe test, then the multi-axis robotic arm and main gripper may move the finished product (the assembled container) to the output tray. If the system determines that the cap and container body fails the child safe test, then the multi-axis robotic arm and main gripper may move the finished product to a reject bin.

The design of the system can be adapted easily to work with different child-safe container sizes and locking designs.

In other embodiments a separate robotic system may be used to separate incoming assembled containers into individual caps and container bodies, in order to off load this manual effort from an operator.

In other embodiments the child-safe caps and container bodies are tested separately on surrogate fixtures without leaving them assembled together. This allows the washed, dried and tested caps and container bodies to be stored separately from each other in bulk form. This may save the operator the extra manual step of removing the child-safe caps from the container bodies before filling with a controlled substance or the like (e.g., pharmaceuticals).

Various aspects of the present disclosure are also addressed by the following paragraphs and in the noted combinations:

1. An automated system for refurbishing reusable child-safe containers comprising:
   a. a station for washing and drying incoming child-safe containers and associated child-safe caps;
   b. a multi axis robotic arm fixed at one end to a chassis and with a gripper apparatus mounted to the other end;
   c. a capping station for assembling together and testing washed and dried incoming child-safe containers to associated child-safe caps;
   d. a station to accept and store completed child-safe container assemblies which pass child-safe testing;
   e. a station to accept and store completed child-safe container assemblies which fail child-safe testing;

2. A refurbishing system as in paragraph 1, wherein said station for washing and drying incoming child-safe containers and associated child-safe caps, comprises;
   a. stationary racks for holding incoming child-safe containers and associated child-safe caps;
   b. moving racks for holding, reorienting or repositioning and incoming child-safe containers and associated child-safe caps;
   c. spring loaded holders to securely retain the child-safe containers during movement;
   d. spraying apparatus for spraying pressurized cleaning and rinsing solution;
   e. drying apparatus for circulating heated air throughout the wash station;
   f. an optional configuration which allows sterilization of the incoming caps and containers, by means such as heat, solvents or radiation;

3. A refurbishing system as in paragraph 1, wherein said multi axis robotic arm, comprises;
   a. a series of translational and rotational electromechanical stages attached together, fixed at one end with the other end free to move to various points within the system;
   b. an electromechanical or pneumatic gripper attached to the free end of the series of translational and rotational stages, the gripper has attached jaws designed to optimally grip child safe caps and containers;
   c. a means to quantitatively measure the position of the gripper attached to the free end of the series of translational and rotational stages;

4. A refurbishing system as in paragraph 1, wherein said capping station for assembling together and testing washed and dried incoming child-safe containers to associated child-safe caps, comprises;
   a. an electromechanical or pneumatic lower gripper, capable of securely holding child-safe containers;
   b. an upper gripper with attached gripper jaws, capable of securely holding child-safe caps;
   c. components attached to the upper gripper which provides a means to move the upper gripper in directions parallel to the child safe container axis and rotationally around the child safe container axis;
   d. a means to quantitatively measure the linear and rotational movements applied to the upper gripper;
   e. a means to quantitatively measure the linear and rotational forces experienced by the upper gripper when the upper gripper jaws are held stationary at the free end;
   f. a means of determining, through position and force measurements, whether or not the child-safe features of an assembled container meet predetermined criteria for successful function, after processing through the system;
   g. a means to moving the lower gripper to a position that is not directly underneath the upper gripper in order to provide more room and better access to the lower gripper;
   h. an optional configuration that allows washed and dried caps and containers to be tested and then placed in the output drawers separately, unassembled from each other, in bulk form.

5. A child-safe container refurbishment system, comprising:
   a washing station;
   an assembly station configured to install a cap on a container body to define a child-safe container;
   a storage station configured to receive child-safe containers from said assembly station; and
   a robotic arm comprising a gripper and configured to move between said washing station, said assembly station, and said storage station, wherein said robotic arm is configured to separately transfer caps and container bodies that have been washed in said washing station to said assembly station.

6. The container refurbishment system of paragraph 5, wherein said washing station comprises a sprayer.

7. The container refurbishment system of any of paragraphs 5-6, wherein said washing station comprises a dryer.

8. The container refurbishment system of any of paragraphs 5-7, wherein said storage station comprises a rack that accommodates a plurality of assembled containers.

9. The container refurbishment system of any of paragraphs 5-8, wherein said robotic arm is movable in at least four different dimensions.

10. The container refurbishment system of any of paragraphs 5-9, wherein said robotic arm comprises a container component gripper.

11. The container refurbishment system of any of paragraphs 5-10, wherein said robotic arm is configured to move from said washing station to said assembly station, and is configured to move from said assembly station to said storage station.

12. The container refurbishment system of paragraph 11, wherein said robotic arm is configured to move from said assembly station to one of said storage station and a disposal station for each assembled container handled by said robotic arm.

13. The container refurbishment system of any of paragraphs 5-12, wherein said assembly station comprises a container cap gripper and a separate container body gripper.

14. The container refurbishment system of paragraph 13, wherein said container cap gripper is configured to be movable along a first axis and relative to said container body gripper, and is further configured to rotate said container cap gripper about said first axis.

15. The container refurbishment system of paragraph 14, wherein said container cap gripper is movable in a first direction along said first axis and towards said container body gripper, and is movable in a second direction along said first axis and away from said container body gripper.

16. The container refurbishment system of any of paragraphs 13-15, further comprising:
a first container cap and a first container body,
a first operational configuration comprising said container body gripper being in a second position, wherein a first position of said container body gripper aligns said container body gripper with said container cap gripper, wherein said second position has said container body gripper being out of alignment with said container cap gripper, and wherein said first operational configuration further comprises said gripper of said robotic arm engaging and disposing said first container body in said container body gripper and thereafter engaging and positioning said first container cap on said first container body.

17. The container refurbishment system of paragraph 16, further comprising:
a second operational configuration comprising moving said container body gripper from said second position to said first position and while said container body gripper is in an engaged configuration relative to said first container body.

18. The container refurbishment system of paragraph 17, further comprising:
a third operational configuration comprising said container body gripper being in said first position, said container cap gripper being both toward said container body gripper and rotated, all with said container cap gripper being in an engaged configuration relative to said first container cap, with said container body gripper remaining in said engaged configuration relative to said first container body, with said container body gripper being retained in a fixed position, and with said first cap remaining positioned on said first container body.

19. The container refurbishing system of paragraph 18, further comprising:

a fourth operational configuration comprising said container cap gripper attempting to move said first container cap relative to said first container body in at least one dimension to assess securement of said first cap to said first container body, said fourth operational configuration comprising said container cap gripper remaining in said engaged configuration relative to said first container cap, said container body gripper remaining in said engaged configuration relative to said first container body, and said container body gripper being retained in said fixed position.

20. The refurbishment system of any of paragraphs 13-15, wherein said container body gripper is disposable between engaged and disengaged configurations.

21. The refurbishment system of any of paragraphs 13-15, wherein said container body gripper is movable between first and second positions, wherein said first position aligns said container body gripper with said container cap gripper, and wherein said second position disposes said container body gripper out of alignment with said container cap gripper.

22. A method of refurbishing a child-safe container, comprising:
washing a container cap and a container body at a washing station;
executing a first transporting step comprising transporting said container body to an assembly station after said washing step;
executing a second transporting step comprising transporting said container cap to said assembly station after both said washing step and said first transporting step, wherein said first transporting step and said second transporting step are executed by a robotic arm;
installing said container cap on said container body to define an assembled child-safe container, wherein said installing step is executed after said second transporting step; and
executing a third transporting step after said installing step and comprising transporting said assembled container away from said assembly station, said third transporting step being executed by said robotic arm.

23. The method of paragraph 22, wherein said first transporting step comprises transporting said container body from said washing station to said assembly station, and wherein said second transporting step comprises transporting said container cap from said washing station to said assembly station.

24. The method of any of paragraphs 22-23, wherein said installing step comprises:
engaging said container body with a container body gripper;
engaging said container cap with a container cap gripper;
moving said container cap gripper along an axis and toward said container body; and
rotating said container cap gripper relative to said container body gripper to detachably engage said container cap with said container body.

25. The method of paragraph 24, wherein said rotating step comprises rotating said container cap gripper about said axis.

26. The method of any of paragraphs 24-25, wherein said moving step comprises pressing said container cap against said container body, and wherein said rotating step is executed after at least a portion of said pressing step.

27. The method of any of paragraphs 24-26, further comprising:
moving said container body gripper between a first position and a second position, wherein said first position comprises said container body gripper being aligned with said container cap gripper for each of said moving step and said rotating step.

28. The method of paragraph 27, wherein said second position comprises said container body gripper being out of alignment with said container cap gripper.

29. The method of paragraph 28, wherein said container body gripper is in said second position for said first transporting step, wherein said robotic arm transfers said container body to said container body gripper when in said second position.

30. The method of paragraph 29, wherein said container body gripper is in said second position for said second transporting step, wherein said robotic arm transfers said container cap onto an end of said container body with container body gripper being in said second position.

31. The method of paragraph 30, further comprising:
moving said container body gripper from said second position to said first position, wherein said moving step and said rotating step for said container cap gripper are executed with said container body gripper being in said first position.

DETAILED DESCRIPTION

Figure 1:
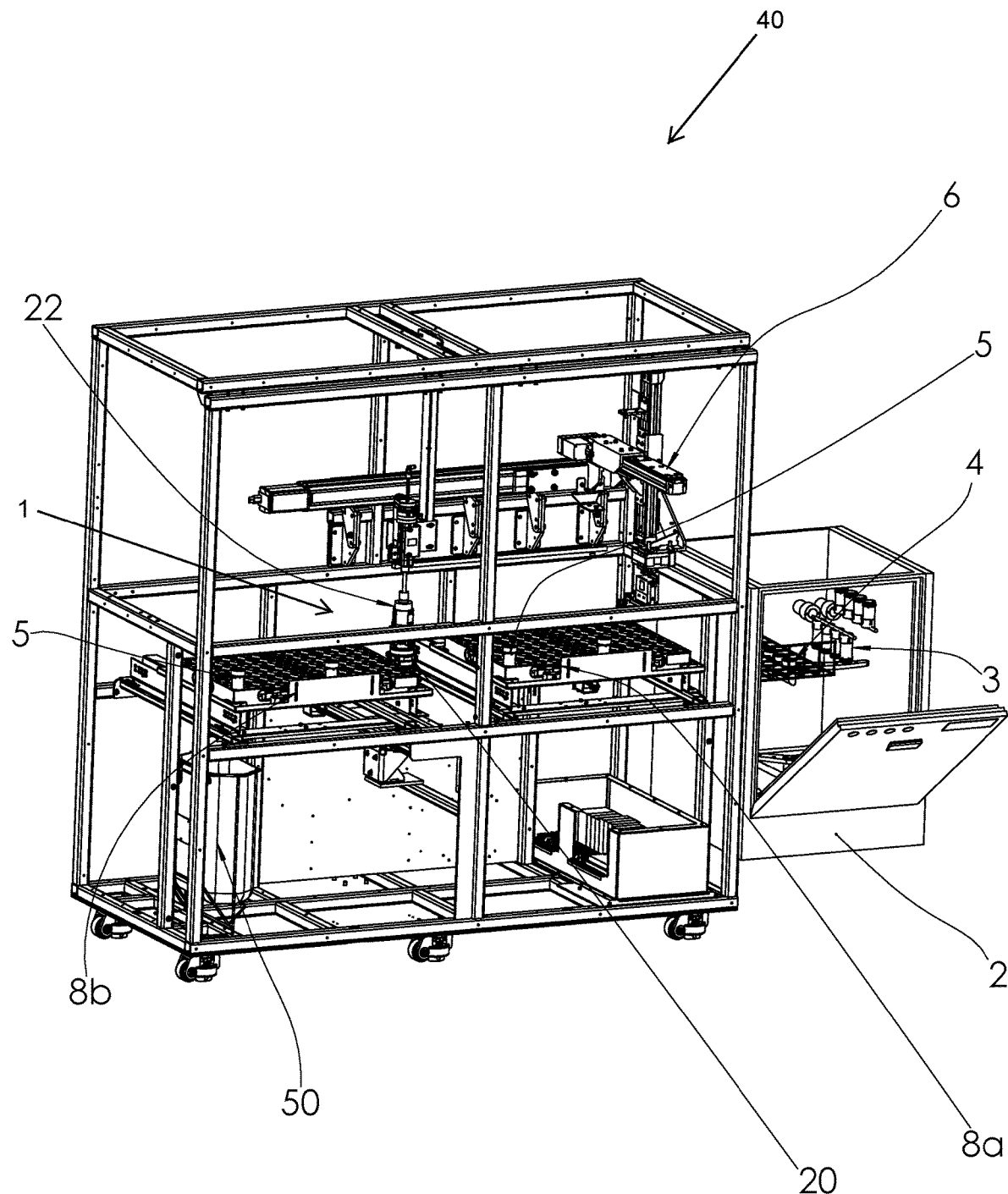
FIG. 1 is a perspective view of an embodiment of a refurbishing system for reusable, child-safe containers.
Figure 1A:
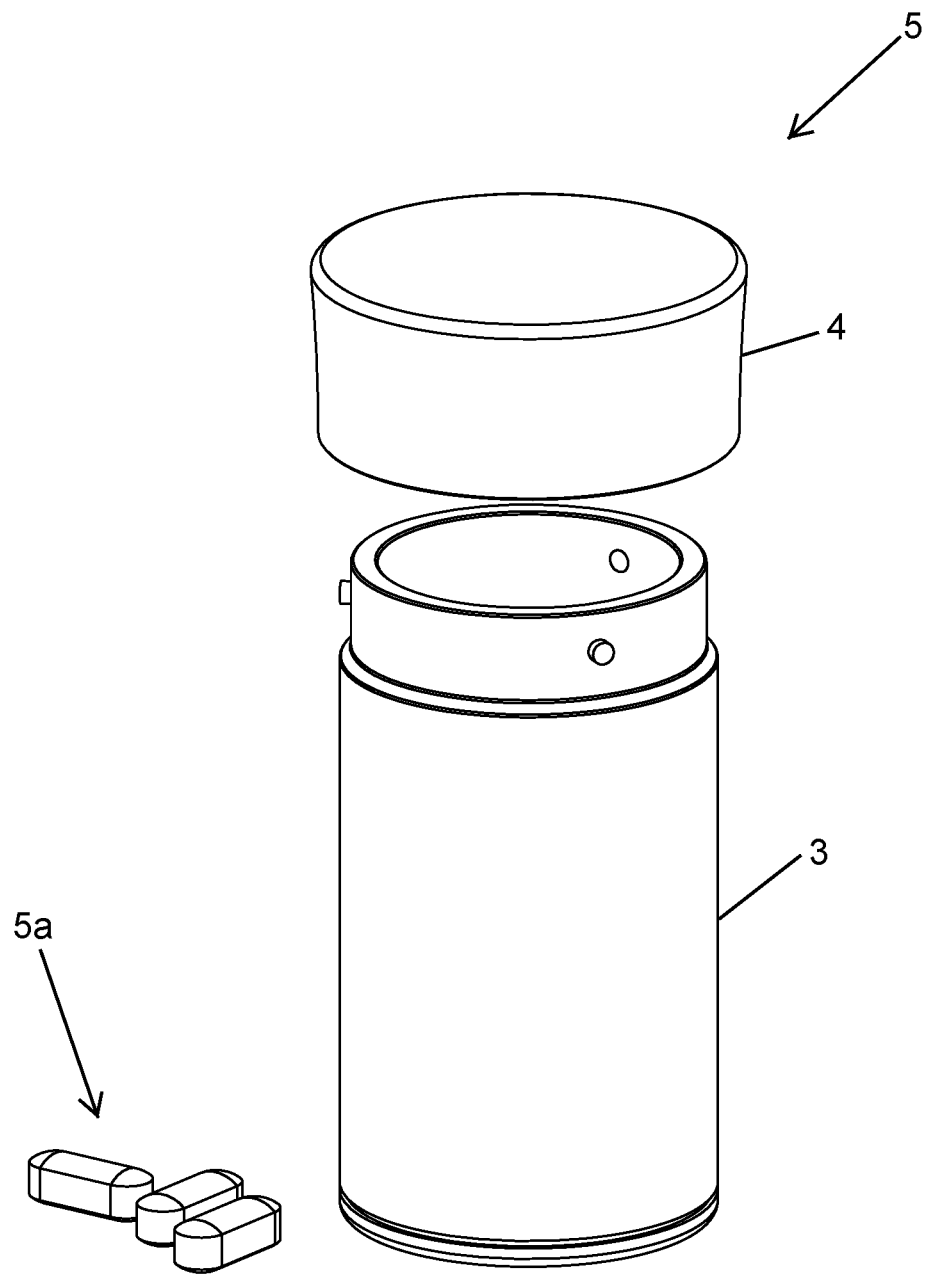
FIG. 1A is a perspective view of a representative child-safe container that may be used in conjunction with the refurbishing system of FIG. 1.

FIG. 1 shows a representative embodiment of a refurbishing system for reusable, child-safe containers and that is identified by reference numeral 40. An enlarged view of a representative container that may be processed by this refurbishing system 40 is illustrated in FIG. 1A and is identified by reference numeral 5. The container 5 includes a container body 3 and a cap 4 that is detachably connectable to the container body 3. The container 5 may be of a child-safe configuration to reduce the potential of a child being able to detach the cap 4 from the container body 3 (e.g., to reduce the potential of a child accessing contents of the container 5, such as pharmaceuticals 5a or other contents). For instance, lugs may be included on an outer, upper perimeter of the container body 3 that may be disposed with a corresponding slot on an inside surface of a sidewall of the cap 4, where rotation of the cap 4 relative to the container body 3 disposes these lugs in a different portion of the corresponding slot that resists pulling the cap 4 away from the container body 3 to remove the cap 4 from the container body 3. Moreover, a user may have to "push down" on the cap 4 (e.g., there may be a compressible seal between the cap 4 and container body 3), and then rotate the cap 4 relative to the container body 3 such that the cap 4 may be removed from the container body 3.

By way of initiation summary and referring back to FIG. 1, the refurbishing system 40 includes a wash assembly or station that holds and washes the incoming child-safe container bodies 3 and caps 4. A multi-axis robotic arm 6 of the refurbishing system 40 includes an attached main gripper 13 (FIG. 2) to engage and move the washed container bodies 3 and caps 4 from the washing station 2 to a container capping assembly or station 1. This capping station 1 includes an upper gripper 22 (for engaging a cap 4), and a lower gripper 20 (for engaging a container body 3). After a cap 4 is attached to a container body 3 at the capping station 1, the resulting container 5 may be tested by the capping station 1. Thereafter, the robotic arm 6 with the attached main gripper 13 moves the assembled child-safe container 5 to an output tray 8a, 8b if the assembled container 5 is determined to be sufficient for reuse, or to a reject bin 50 if the assembled container 5 is determined to be insufficient for reuse.

Figure 2:
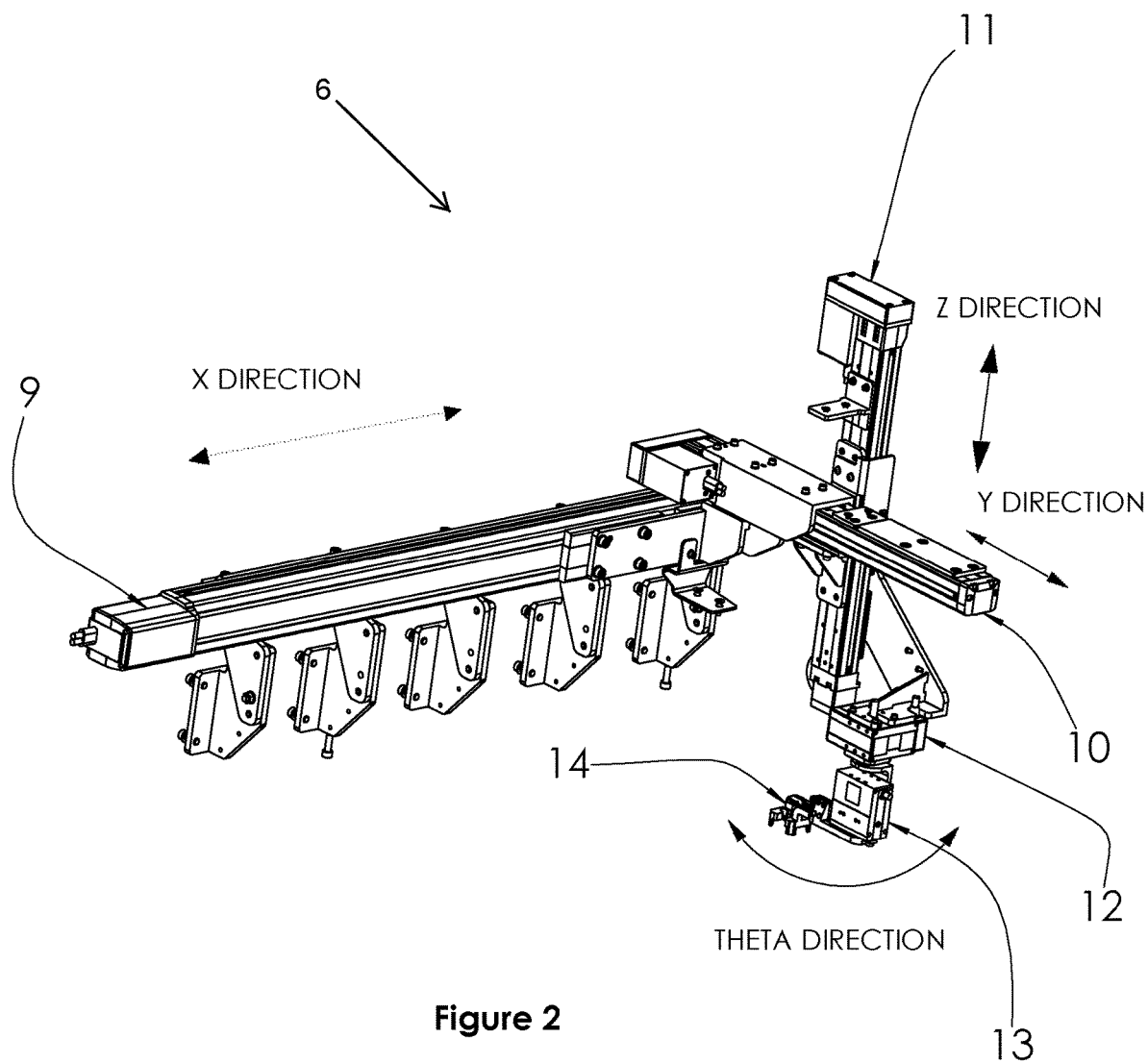
FIG. 2 is a perspective view of a multi-axis robotic arm that may be used to transport container bodies, caps, and assembled containers throughout the refurbishing system of FIG. 1.

FIG. 2 is a detailed view of the multi-axis robotic arm 6 with main gripper 13, and which provides the means to move and position child-safe container bodies 3, caps 4, and assembled containers 5 throughout the system 40. In the 4-axis arm embodiment shown in FIGS. 1 and 2, the x, y and z degrees of freedom are provided by electric motor driven lead screws 9, 10, 11, respectively, and the rotary degree of freedom, theta, is provided by a rotational drive 12 (e.g., electric motor/gearbox combination). Attached to the rotational drive 12 is an electromechanical main gripper 13 with attached gripper jaws 14 which provide the means to grasp various sizes of components (and individual components thereof), and is able to grip, move, and release either child-safe container bodies 3, caps 4, or child-safe containers 5 (a container 5 being an assembled configuration, where a cap 4 is installed on/attached to a container body 3). In other embodiments, the multi-axis robotic arm 6 with main gripper 13 can be other, various combinations of translation stages, including linear, rotary, electro-mechanical, and pneumatic.

Figure 3:
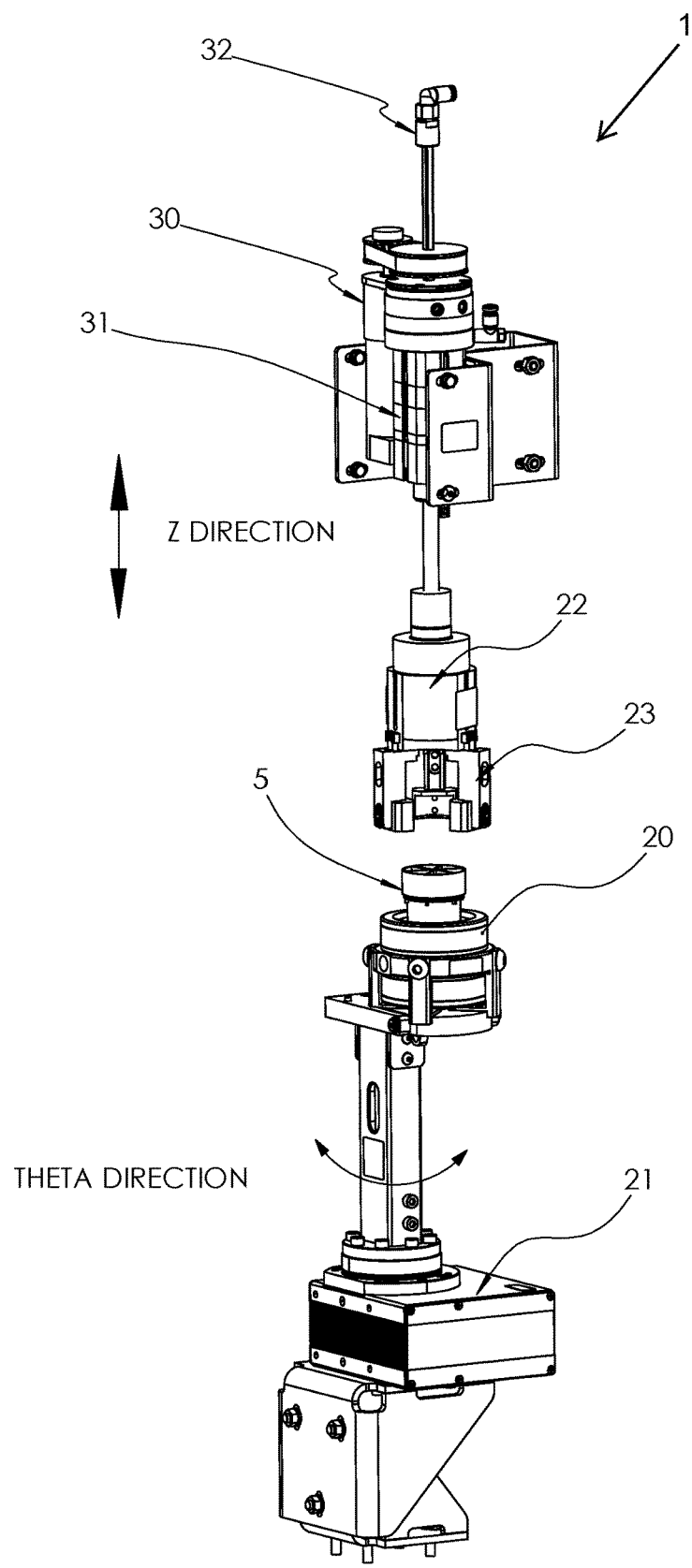
FIG. 3 is a perspective view of a capping or assembly station for the refurbishing system of FIG. 1, where an upper gripper is aligned with but spaced from a cap on a container body being engaged by a lower gripper.

FIG. 3 is a detailed view of the container capping assembly or station 1 which provides the means to assemble child-safe container bodies 3 to child-safe caps 4, by the appropriate rotary and compression movements to engage the corresponding child-safe features of the resulting container 5. The capping station 1 includes a lower gripper 20, which holds the child-safe container body 3 in a stationary of fixed position, for instance when installing a cap 4 on a container body 3, as well as when testing the assembled container 5. The lower gripper 20 may grasp the child-safe container body 3 by pneumatic, or other electro-mechanical means capable of securely gripping and releasing various sizes of container bodies 3 and without damaging the container body 3.

Figure 3A:
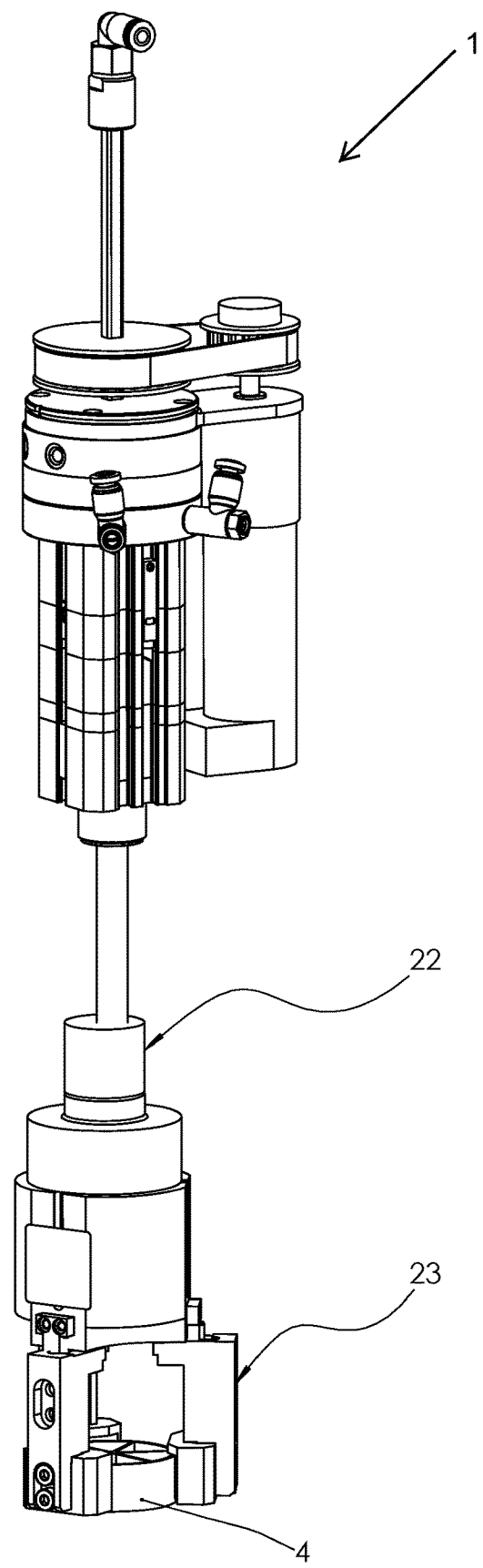
FIG. 3A is an enlarged perspective view of the capping station of FIG. 3, with its upper gripper engaging a cap.

The capping station 1 includes an upper gripper 22 with attached gripper jaws 23, capable of securely gripping child-safe caps 4 (e.g., FIG. 3A which shows the upper gripper 22 with attached gripper jaws 23 engaging a child-safe cap 4). The upper gripper 22 is attached to components which provides the means to move the upper gripper 22 in the z and rotary directions. A z translation stage 31 moves the upper gripper 22 parallel to/co-linearly with the child safe container body axis (the axis about which a sidewall of the container body 3 extends), and a rotary translation stage 30 rotates the upper gripper 22 around/about the child-safe container body axis. The z translation stage 31 and rotary translation stage 30 allow the upper gripper 22 to rotate child-safe caps 4, in combination with pushing and pulling the child-safe caps 4 towards and away from, respectively, the corresponding child-safe container body 3 being held in a stationary position by the lower gripper 20. These rotating and axial movements allow the upper gripper 22 of the capping station 1 to install child safe-caps 4 on child-safe container bodies 3, as well as to pull on a cap 4 (when locked to a corresponding container body 3 via the child-safe features) with a predetermined force in order to in order to test the child-safe lock of the assembled container 5. A means of measuring compression and tension applied by the upper gripper 22 to the engaged child-safe cap 4, such as a strain gauge, may be integral with/used by the capping station 1. A means of measuring rotational and linear positions of the upper gripper 22 and cap 4, such as encoders or hall sensors, may be integral with/used by the capping station 1.

FIG. 3 shows the upper gripper 22 of the capping station 1 in a raised position achieved by the z translation stage 31 (e.g., prior to engaging the cap 4 to install the same on the container body 3). A motor of the rotary translation stage 30 is coupled to the z translation stage 31 which enables the z translation stage 31 and the upper gripper 22 of the capping station 1 to rotate caps 4. Upper gripper jaws 23 are attached to the upper gripper 22 and enable secure gripping to caps 4. In the embodiment shown, the z translation stage 31 is actuated by pneumatic and spring loaded means, so a rotary pneumatic fitting 32 is included to avoid tangling of the attached pneumatic tubing during rotation.

Figure 4:
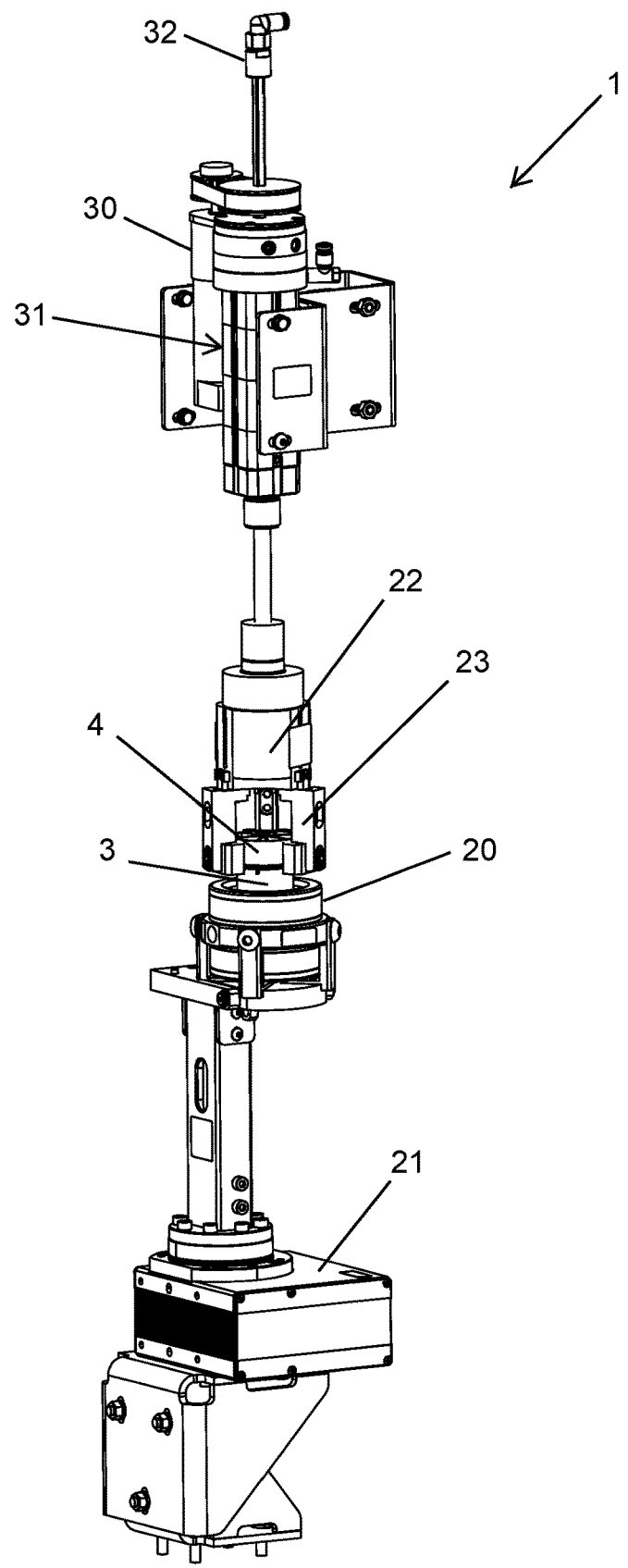
FIG. 4 is a perspective view of the capping station of FIG. 3, where the upper gripper is engaged with a cap positioned on a container body.

FIG. 4 shows the upper gripper 22 of the capping station 1 in a lowered position achieved by the z translation stage 31. The lowered position allows the upper gripper 22 to grasp the cap 4 and secure the cap 4 in position on the container body 3 (being held in place by the lower gripper 20 of the capping station 1). This lowered position allows the upper gripper 22 to grasp the cap 4 and rotate the cap 4 relative to the container body 3 (being held in place by the lower gripper 20 of the capping station 1) to secure the cap 4 relative to the container body 3. The upper gripper 22 may "press" the cap 4 against the container body 3, and during this pressing action may rotate the cap 4 relative to the container body 3 to secure the cap 4 to the container body 3 using one or more child-safe features.

Figure 5:
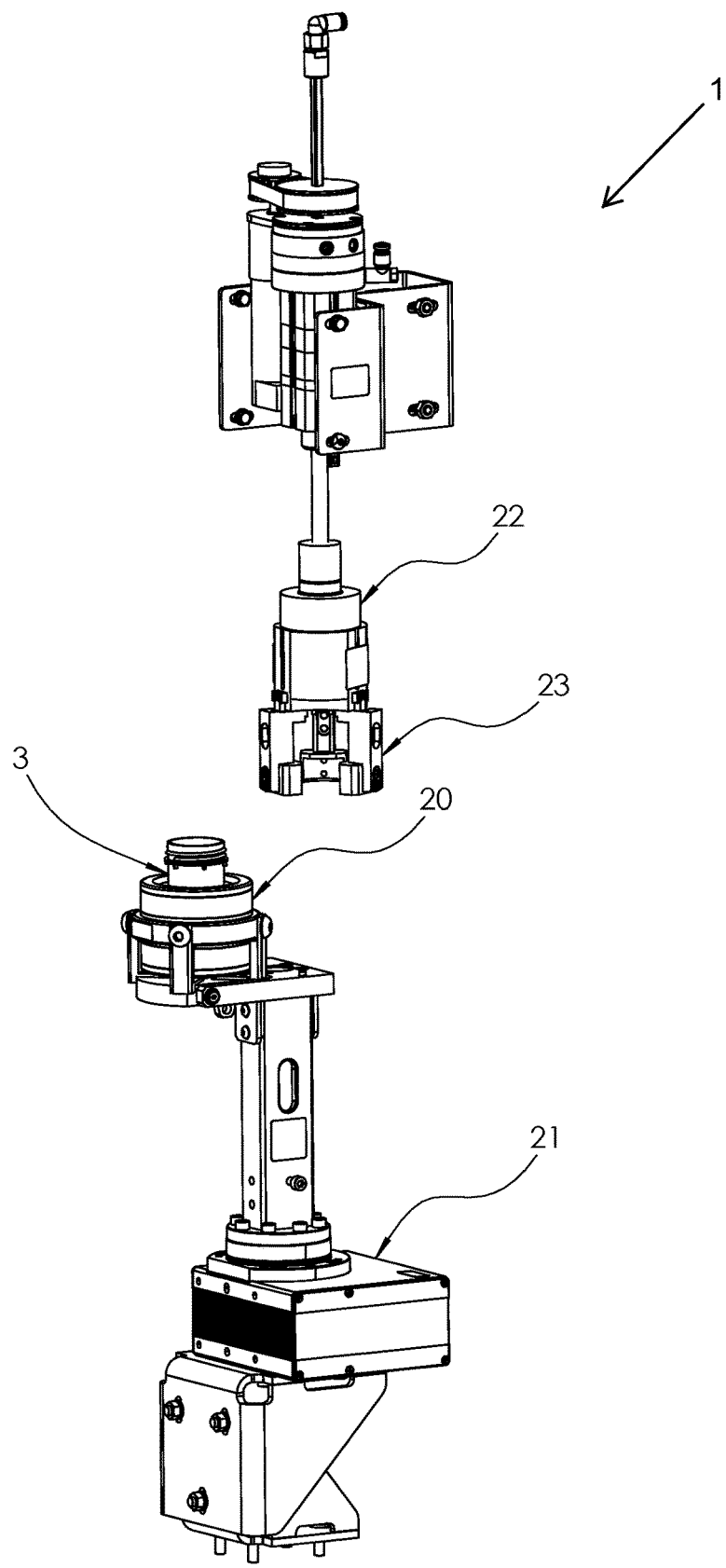
FIG. 5 is a perspective view of the capping station of FIG. 3, where the lower gripper is in position to receive a container body from the robotic arm of FIG. 2.

FIG. 5 shows an embodiment where the lower gripper 20 of the capping station 1 is attached to a rotary stage 21 (e.g., a rotational drive of any appropriate type), and where the lower gripper 20 has been rotated out of alignment with the upper gripper 22 of the capping station 1 (e.g., a second position for the lower gripper 20). The FIG. 5 configuration allows space for the main gripper 13 of the multi-axis robotic arm 6 to place and remove container bodies 3 into and out of the lower gripper 20. A cap 4 may also be positioned on the upper end of the container body 3 by the robotic arm 6 (via its gripper 13) when the lower gripper 20 is in the position shown in FIG. 5. With a cap 4 having been positioned on the upper end of the container body 3, the lower gripper 20 may be moved back to where the upper gripper 22 is aligned with the lower gripper 20 (a first position, and as shown in FIG. 3), for securement of the cap 4 relative to the container body 3 in accordance with the foregoing.

Figure 6:
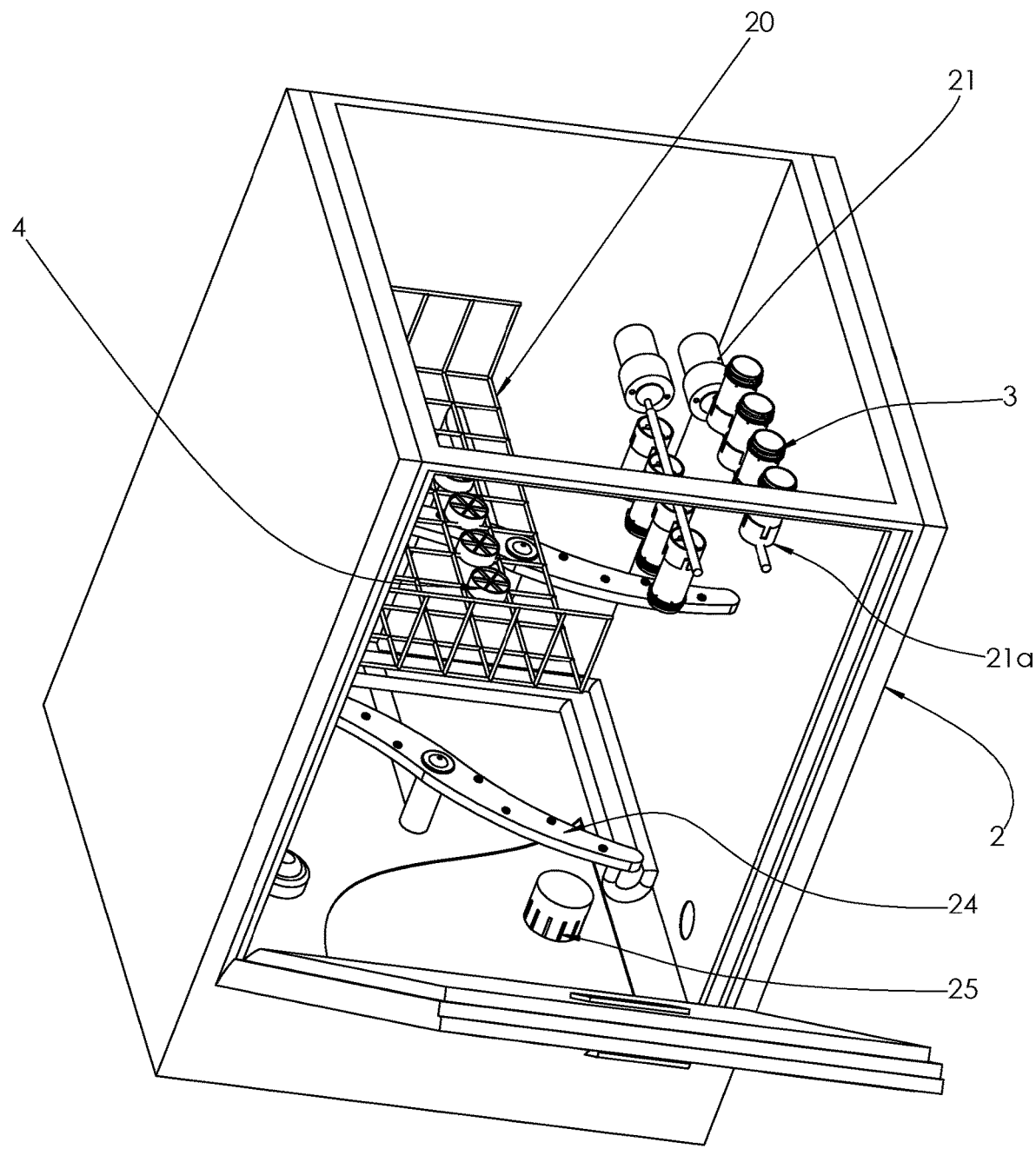
FIG. 6 is a perspective view of a washing station used by the refurbishing system of FIG. 1.

FIG. 6 shows the wash station 2 with stationary racks 20 holding child-safe caps 4. Movable racks 21 are shown holding child-safe container bodies 3 to optimize their position for either draining (one rack 21), or being picked up by the multi-axis robotic arm 6 for transfer to the capping station 1 (another of the racks 21). The movable racks 21 include spring loaded holders 21a to securely retain the child-safe container bodies 3 during movement. The wash station 2 also includes a spraying apparatus 24 for spraying pressurized cleaning and rinsing solution, and a drying apparatus 26 for circulating heated air throughout the wash station 2.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

Any feature of any other various aspects addressed in this disclosure that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular. Moreover, any failure to use phrases such as "at least one" also does not limit the corresponding feature to the singular. Use of the phrase "at least generally" or the like in relation to a particular feature encompasses the corresponding characteristic and insubstantial variations thereof (e.g., indicating that a surface is at least substantially or generally flat encompasses the surface actually being flat and insubstantial variations thereof). Finally, a reference of a feature in conjunction with the phrase "in one embodiment" does not limit the use of the feature to a single embodiment.

What is claimed is:
1. A child-safe container refurbishment system, comprising:
a washing station operable to wash a cap and a container body;
an assembly station configured to install the cap on the container body to define a child-safe container after the cap and the container body have been washed by the washing station, wherein said assembly station comprises a container cap gripper and a separate container body gripper, wherein said container cap gripper is configured to be movable along a first axis and relative to said container body gripper and is further configured to rotate said container cap gripper about said first axis, wherein said container cap gripper is movable in a first direction along said first axis and towards said container body gripper, and is movable in a second direction along said first axis and away from said container body gripper, and wherein, to perform testing of a child-safe function of the child-safe container, the assembly station operates the container cap gripper attempting to move the cap relative to the container body in at least one dimension to assess securement of the cap to the container body wherein, during the testing, the assembly station performs programmed pushing, pulling, and rotating actions on the cap;

an output tray configured to receive child-safe containers from said assembly station; and a robotic arm comprising a gripper and configured to move between said washing station, said assembly station, and a storage station, wherein said robotic arm is configured to separately transfer the cap and the container body or to transfer the cap and the container body together as the child-safe container that have been washed in said washing station to said assembly station for the testing of the child-safe function and from the assembly station to the storage station only when the child-safe container is successfully tested as being able to perform the child-safe function.

2. The container refurbishment system of claim 1, wherein said output tray comprises at least one rack that accommodates a plurality of assembled containers.

3. The container refurbishment system of claim 1, wherein said robotic arm is movable in at least four different dimensions.

4. The container refurbishment system of claim 1, further comprising:

a first operational configuration comprising moving said container body gripper from a second position to a first position and while said container body gripper is in an engaged configuration relative to the container body.

5. The container refurbishment system of claim 4, further comprising:

a second operational configuration comprising said container body gripper being in said first position, said container cap gripper being both moved toward said container body gripper and rotated, all with said container cap gripper being in an engaged configuration relative to the container cap, with said container body gripper remaining in said engaged configuration relative to said container body, with said container body gripper being retained in a fixed position, and with the cap remaining positioned on the container body.

6. The container refurbishing system of claim 5, wherein during the testing of the child-safe function said container cap gripper remains in said engaged configuration relative to said container cap, said container body gripper remains in said engaged configuration relative to said container body, and said container body gripper is retained in said fixed position.

7. The refurbishment system of claim 1, wherein said container body gripper is movable between first and second positions, wherein said first position aligns said container body gripper with said container cap gripper, and wherein said second position disposes said container body gripper out of alignment with said container cap gripper.

8. The container refurbishment system of claim 1, wherein said washing station comprises a sprayer.

9. The container refurbishment system of claim 1, wherein said washing station comprises a dryer.

10. The container refurbishment system of claim 1, wherein said robotic arm comprises a container component gripper.

11. The container refurbishment system of claim 1, wherein said robotic arm is configured to move from said washing station to said assembly station, and is configured to move from said assembly station to said storage station.

12. The container refurbishment system of claim 11, wherein said robotic arm is configured to move from said assembly station to one of said output tray for each child-safe container passing the testing and a disposal station for each assembled container handled by said robotic arm failing the testing of the child-safe function.

13. A child-safe container refurbishment system, comprising:

a washing station controlled to operate to wash a cap and a container body;

an assembly station first controlled to operate to install the cap on the container body to define a child-safe container after the cap and the container body have been washed by the washing station, and wherein, to perform testing of a child-safe function of the child-safe container, the assembly station is second controlled to attempt to move the cap relative to the container body in at least one dimension to assess securement of the cap to the container body;

an output tray configured to receive child-safe containers from said assembly station; and a robotic arm comprising a gripper and controlled to move between said washing station, said assembly station, and a storage station, wherein said robotic arm is further controlled to separately transfer the cap and the container body or to transfer the cap and the container body together as the child-safe container that have been washed in said washing station to said assembly station for the testing of the child-safe function and from the assembly station to the storage station only when the child-safe container is successfully tested as being able to perform the child-safe function wherein, when the assembly station is second controlled, the assembly station performs programmed pushing, pulling, and rotating actions on the cap.

14. The container refurbishment system of claim 13, wherein said assembly station comprises a container cap gripper and a separate container body gripper, wherein, during the testing of the child-safe function, said container cap gripper is configured to be movable along a first axis and relative to said container body gripper and is further configured to rotate said container cap gripper about said first axis, and wherein, during the testing of the child-safe function, said container cap gripper is movable in a first direction along said first axis and towards said container body gripper and is movable in a second direction along said first axis and away from said container body gripper.

15. The container refurbishment system of claim 13, wherein, during the programmed pushing, pulling, and rotating actions on the cap, the assembly station monitors applied force and rotary and vertical travel to ensure the cap and the container body have maintained the child-safe function after washing by the washing station and assembly into the child-safe container by the assembly station.

16. A child-safe container refurbishment system, comprising:

a washing station controlled to operate to wash a cap and a container body;

an assembly station first controlled to operate to install the cap on a surrogate container body fixture and install a surrogate cap fixture on the container body to define a child-safe containers after the cap and the container body have been washed by the washing station, and wherein, to perform testing of a child-safe function of the child-safe containers, the assembly station is second controlled to attempt to move the cap relative to the surrogate container body fixture in at least one dimension to assess securement of the cap to the surrogate container body fixture and also to attempt to move the surrogate cap fixture relative to the container body in at least one dimension to assess securement of the surrogate cap fixture to the container body wherein, during the testing, the assembly station performs programmed pushing, pulling, and rotating actions on the cap;

an output tray configured to receive child-safe containers from said assembly station; and a robotic arm comprising a gripper and controlled to move between said washing station, said assembly station, and a storage station, wherein said robotic arm is further controlled to separately transfer at least one of the cap and the container body that have been washed in said washing station to said assembly station for the testing of the child-safe function and from the assembly station to the storage station only when a corresponding one of the child-safe containers is successfully tested as being able to perform the child-safe function.

\* \* \* \* \*